Feb. 22, 1966  W. H. W. SCHULLER  3,235,913
METHOD FOR CONTINUOUSLY PRODUCING GLASS FIBRE MATS
Original Filed May 1, 1962  2 Sheets-Sheet 1

INVENTOR
WERNER H. W. SCHULLER
BY
Morgan, Finnegan, Durham & Pine
ATTORNEYS

Feb. 22, 1966    W. H. W. SCHULLER    3,235,913
METHOD FOR CONTINUOUSLY PRODUCING GLASS FIBRE MATS
Original Filed May 1, 1962    2 Sheets-Sheet 2
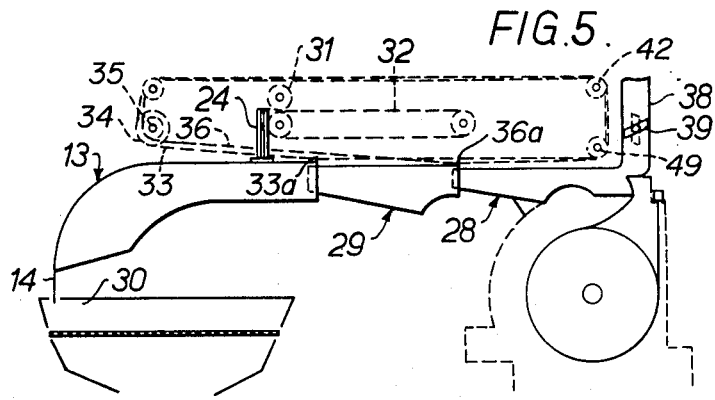
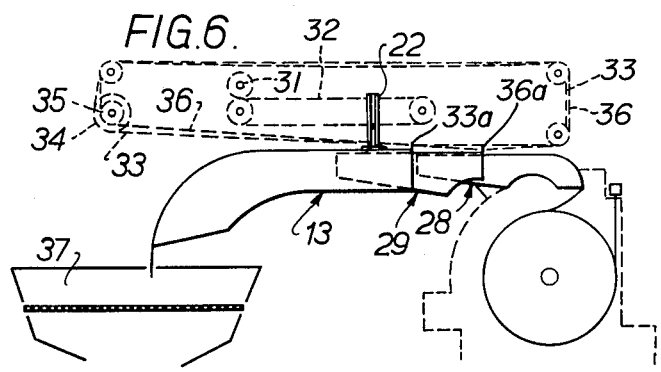
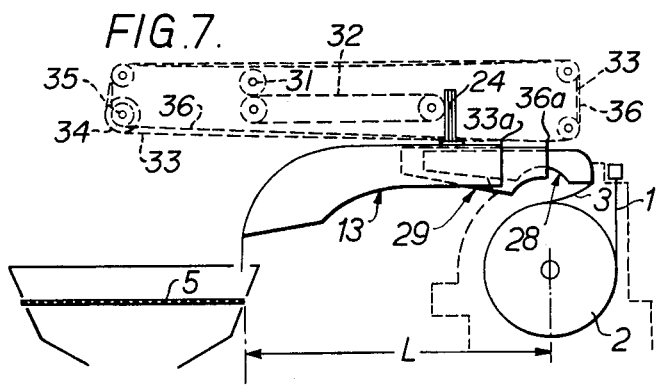
INVENTOR
WERNER H.W. SCHULLER
BY
Morgan, Finnegan, Durham & Pine
ATTORNEYS

United States Patent Office 3,235,913
Patented Feb. 22, 1966

3,235,913
METHOD FOR CONTINUOUSLY PRODUCING
GLASS FIBRE MATS
Werner Hugo Wilhelm Schuller, Postfach 76,
Wertheim (Main), Germany
Original application May 1, 1962, Ser. No. 191,625, now Patent No. 3,187,387. Divided and this application Aug. 3, 1964, Ser. No. 392,988
Claims priority, application Germany, May 6, 1961,
Sch 29,673
4 Claims. (Cl. 19—156.3)

This application is a divisional application of my copending application Serial Number 191,625 filed May 1, 1962.

The invention relates to a method and apparatus for the continuous production of a glass fibre mat from staple glass fibre in which the staple fibres are carried in an air stream from a position of manufacture to a position of deposition on a conveyor belt on which the fibres are built-up in superposed relation to form a mat of the desired density and thickness.

In such a process a main difficulty is to convey the fibres separately in the air stream in such manner as to be laid uniformly on the conveyor belt to present a mat of uniform predetermined density and thickness throughout the mat.

This is especially important for mats of a thickness of 0.3–0.8 mm. which only weigh 42–75 g./m.$^2$. The slightest uneven glass fibre allocation per unit area will show and produce a variation in tensile strength, density, porosity, electrical resistance or light transmission characteristics when such mats are used for example, for roofing felt, pipe wrap, air filters, battery retainer mats and lampshades. All these applications have to rely on a uniform mat thickness.

The invention has among its objects to avoid these disadvantages, and to provide for substantially uniform flow of the air stream carrying the staple fibres from the position of manufacture to the position of deposition on the conveyor belt.

According to the method of the invention the flow of air carrying the fibres is controlled so as to maintain the fibres separate and travelling in a path close to the top of guide means formed at one end as a stationary nozzle and at the other end formed as an inverted channel section adapted to be horizontally reciprocated whereby the fibres in such movement may be deposited at a uniform rate and density on an endless moving conveyor belt which is pervious to air, and beneath which a vacuum is constantly applied.

According to the invention, in a method of conveying staple glass fibres from a position of manufacture to a position of deposition onto an air-pervious conveyor belt, the guide channel is formed to an inverted open U-section and the separate staple fibres are caused to float in an air current in a zone adjacent the top of the guide channel, and means are provided to project additional streams of air, advantageously directed upwardly at an angle to the air stream in the guide channel, whereby a steady flow of fibres is passed to the reciprocating distributing head therefor, advantageously downwardly curved at the end, to direct the fibres in a continuous stream onto the surface of the air-pervious belt in such manner as to build up a mat made of staple fibres disposed at random on the belt to a desired thickness and density.

Such air stream or streams may be forced into the main stream under pressure or may be drawn into the main stream by suction.

Alternatively, or in addition, the cross-sectional area of the guide means may be varied for a determined length or may be tapered with a view to maintaining a uniform rate of flow of the fibre-conveying air.

The invention is of particular advantage in the case of "thin" mats by which is meant mats within the range of thickness of 0.3 to 0.8 mm. and with a weight of 42–75 g./m.$^2$.

According to the invention furthermore, units consisting of fibre-producing and fibre-conveying means may be provided in plurality along each side of the conveyor belt advantageously in staggered relation and if desired at an angle to the main axis of the conveyor belt and partitions may be provided between each unit.

According to the invention furthermore, means may be provided for controlling and varying the speed of reciprocation of the distributing heads of the units and/or of the belt where such is necessitated for any reason, for example, when recharging one of the fibre-producing units, whereby the weight and thickness of the mat will remain substantially uniform throughout.

According to the invention furthermore, the guide means for the air stream carrying the fibres may be formed with an intermediate reciprocable duct between the stationary nozzle member and the distributing head and adapted to move in synchronism with the reciprocating head.

The invention further comprises the features of construction hereinafter described.

The invention is diagrammatically illustrated by way of example in the accompanying drawings, in which:

FIGURES 5 to 7 show a modified construction of apparatus according to the invention, in front view and in three different phases of movement.

While any known method may be used for the production of staple fibres and a current of air generated in any convenient manner for conveying the fibres from a position of manufacture to a position of deposition on the conveyor belt, in the accompanying drawings and following description the method of forming the fibres has been described according to my United States Patent No. 2,996,102, issued August 15, 1961, in which the air generated by a drawing drum is used in part at least to convey the fibres from the position of manufacture to the position of deposition on the belt.

Figure 1:
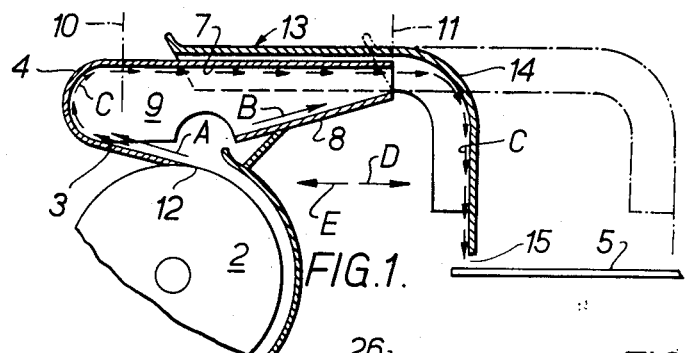
FIGURE 1 is a diagrammatic cross-section on a reduced scale of a simplified embodiment of the invention.

The air carrying the staple fibres moves in the direction of the arrow A (FIGURE 1) into a stationary deflection member or nozzle 4 which reverses the direction of flow and carries the fibers through the nozzle in close proximity to the top wall 7 thereof. The nozzle member is formed with a bottom wall 8 and side walls 9 forming a closed guide duct which tapers towards this outlet.

The bottom wall 8 of the nozzle is inclined upwardly at an angle towards the outlet. Thus air is caused to flow along the inner surface of the wall 7, and at an inclination to the vertical as indicated by the arrow B, with the result that the fibres are caused to closely hug the inner wall of the duct.

Cooperating with the stationary nozzle member 4 is a reciprocating member 13 formed of inverted U-section and with a horizontal portion overlapping the nozzle outlet in its reciprocation and with the other outer end of said member downwardly directed. Means are provided to reciprocate the guide means transversely across the conveyor belt 5 as hereinafter described.

In operation the staple fibres produced by the drawing drum are carried along in the direction of the arrow C to be deposited in a reciprocating movement on the air pervious belt 5. Suction is applied on the underside of the belt.

The high speed of drum 2 causes a peripheral air flow which serves to convey the individual fibres to their depositing means.

The circulating wind produced by the drum and guided by the nozzle produces a force component, approximately as indicated by arrow A, while the nozzle-type design of the fibre guide duct according to the present invention produces a component as indicated by arrow B.

It will be understood that the distributing head is completely open toward the bottom and that only three sides, that is, the cover wall 14 and the two side walls act as restrictions. The flowing fibres do not fall under gravity but are carried along the cover wall 14 until they are deposited at 15, thus enabling the fibres to be conveyed in ambient temperature conditions without need for complicated fixtures.

Figure 2:
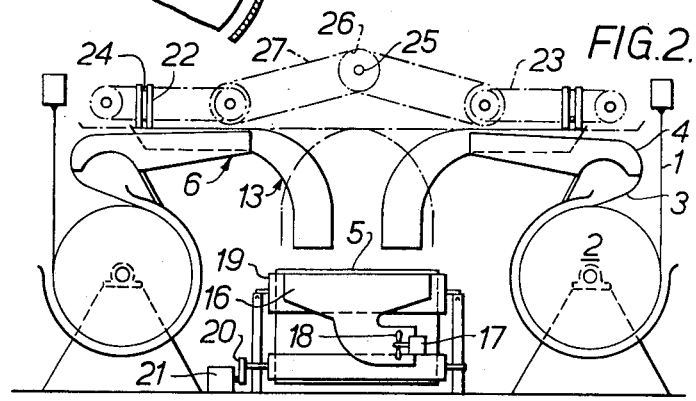
FIGURE 2 is a cross-section on a reduced scale of an installation for the production of a fibre mat, with units set up alongside a conveyor belt in accordance with the invention.
Figure 3:
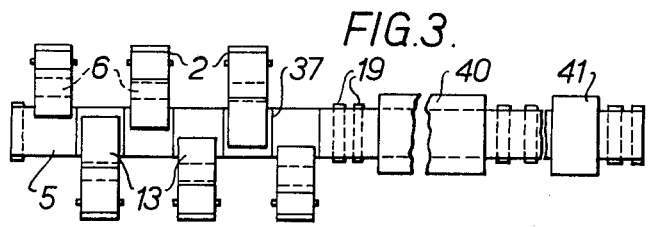
FIGURE 3 is a still further schematized complete view on a still further reduced scale according to FIGURE 2.

As shown in FIGURES 2 and 3 apparatus according to the invention may be provided in number, for example, ten, set up along one or both sides of the conveyor belt 5. The belt 5 is air-permeable and consists, for example, of wire netting. Suction boxes 16 are provided in spaced relationship underneath the belt, each of which boxes is provided with a motor 17 driving a suction fan 18. The conveyor belt 5 passes over rollers 19 and is driven by a belt drive or gear drive 20 and an electric motor 21.

FIGURES 2 and 3 also show the reciprocating heads 13 in various operating positions. Each fibre-producing and conveying unit may be disposed at an angle to the conveyor belt.

The reciprocating heads are moved across the conveyor belt by means of a suitable mechanism, which does not form part of the invention.

In FIGURE 2 the drive is a chain drive, consisting of a slotted guideway 22 mounted on the cover plate of the reciprocating head, with a carrier rod 24 on a chain 23 sliding in the guide slot, so that in the course of one rotation of the chain the rod makes one up and down motion and the reciprocating head is moved back and forth once. The individual chains co-operating with the reciprocating heads may be driven through a central shaft 25, sprocket wheels 26 and chains 27.

Figure 4:
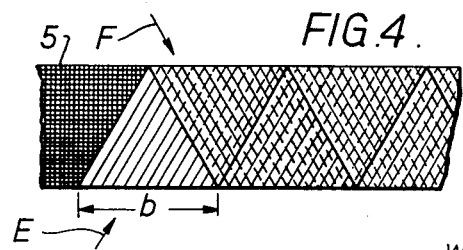
FIGURE 4 is a depositing diagram of an individual depositing head for a fibre mat deposited according to the invention.

FIGURE 4 shows the depositing path followed by one reciprocating head; the conveyor belt is designated by reference numeral 5 and the width of a reciprocating head is illustrated at $b$. At each forward run (arrow E) and return run (arrow F) one reciprocating head deposits one strip of fibre mat which, except for the reciprocating head of the first unit, is deposited across or transversely of the strip deposited by the previous head. It will be seen that in order to obtain the deposit of a full strip of fibre on the conveyor belt for each run of a reciprocating head thereacross, the maximum conveyor belt speed must be equal to the distance $b$ divided by the time required for each run of the reciprocating head across the width of the belt.

FIGURES 5 to 7 show a modified apparatus which is particularly suitable for manufacturing wide mats, for example two meters in width and wider. For this purpose the fibre duct is subdivided into substantially uniform sections, of which the one lying closer to the fibre-producing means and generally indicated by the reference 28 is stationary, and the other duct, located in the direction of movement of the reciprocating head 13, and generally designated by the reference 29, is mobile, and moves in synchronism with the reciprocating head. In doing so, the mobile section 29 slides during its reciprocating motion over section 28, and the reciprocating head 13 at first over section 29 and then over the stationary section 28.

Since in this case the air flow is exposed twice to a force which is directed, at an angle in the upward direction, it can be guided over a relatively long distance at a uniform rate of flow without disturbing the flow of the fibres. This will ensure that the fibres will always leave the distributing heads at a uniform speed and will be deposited continuously and uniformly on the conveyor belt.

The drive of the reciprocating head 13 and the moving section 29 of the fibre guide duct may be selected as desired, provided the movable section is moved with a given delay or time lag in relation to the reciprocating head.

FIGURES 5 to 7 show diagrammatically a possible driving means. Similar to the embodiment according to FIGURE 2 an electric motor drives a chain drive 32 over a pinion 31, with a rotating carrier rod 24 attached to chain drive 32. Also similar to FIGURE 2, carrier rod 24 is operatively connected to head 13 through slotted guideway 22 mounted on the cover plate of the reciprocating head. Head 13 is additionally connected at 33a with reciprocating chain 33, which drives chain 36 over gear wheels 34, 35, chain 36 being connected at 36a with the moving portion 29 of the fibre guide duct. As shown in FIGURES 5–7, chain 33 passes over gear wheel 34 and chain 36 passes over gear wheel 35, both gears 34, 35 being mounted on a common shaft. In operation, an electric motor (not shown) drives chain 32 which imparts up and down motion to carrier rod 24 which, in turn, imparts horizontal reciprocatory movement to head 13. Movement of head 13 drives chain 33 which turns gear wheels 34, 35 and sprockets 42, 49 thereby driving chain 36. However, since gear 35 has a smaller diameter than gear 34, chain 36 will be displaced a proportionately shorter distance than chain 33. Accordingly, this arrangement provides intermediate section 29 with a delayed reciprocating movement in relation to reciprocating head 13.

By subdividing the fibre guide duct into a stationary section and into a moving section, which telescopes in and out with the telescoping head during a reciprocating movement, the distance L between the inner end of the conveyor belt and the drum centre can be practically reduced to the length of the reciprocating head, which is a considerable advantage.

FIGURE 5 shows the respective, completely extended guide means 13–29–28, with the reciprocating head located at a reversing position.

FIGURE 6 shows a center position and FIGURE 7 the completely closed or telescoped position wherein the reciprocating head is located at the other reversing position.

Where a number of units are mounted in staggered relation on each side of the conveyor belt, partition members 37 may be provided between adjacent units, so that any air currents which might occur particularly at the reversing position of the distributing head, are prevented from disturbing the uniform and steady flow of the fibres.

If very large widths of mat are required, or if for any other reason the air flow produced by the drum is insufficient to carry the fibers at a constant rate of flow, additional air, as shown in FIGURE 5, may be blown-in by means of a fan, not shown, through a socket 38 into the main air flow, in order to make up for the reduction of air pressure when the distributing head as shown in FIGURE 5, is at the outer limit of its travel. To prevent excess air at the inner limit of travel of the reciprocating head, socket 38 is suitably provided with a throttle flap 39, which is controlled by the reciprocating movement of the head 13 or by the moving section 29 of the fibre guide duct in such manner that it will open when the telescoping system 13–29–28 opens, and will close when the system telescopes again.

The production of fibres does not necessarily require the use of a fast rotating drum. The air flow required may be produced with a fan or blower operating to replace the air lost in the conveyance of the fibres to the reciprocating depositing head.

FIGURE 3 shows at 40 a drying oven, in which the mat is brought to a temperature between 100° C. and 150° C. for removing any excess solvent of the binding agent which may be present. Following this operation the mat can be wound up immediately or can be guided through a curing chamber 41, in which it is heated to a higher temperature, for example, between 180° and 220° C. to set the binder.

In one example of carrying out the invention, the mat may be provided in any desired width or it may be of the standard width required in particular industries as, for example, three feet for the roofing industry and for use as pipe wrappings; four feet for roofing shingles and in the building industry in general. Small widths as, for example, for battery separators, of from two inches to twelve inches or twenty inches or more or less may be produced from a standard width sheet, cut on a re-rolling machine in a well-known operation.

The thickness or density of the mat may also be varied by varying the fibre thickness (or density). For example, if an individual fibre has a diameter of 12 microns (1 micron equals $\frac{1}{1000}$ mm.), to obtain a mat of an average thickness of .4 mm. requires approximately 33 layers of individual fibres, and will weigh approximately 46 to 48 g./m.$^2$.

If the individual fibre diameter is to be increased to 14 microns, as for example, for battery separators, the fibre diameters are increased by about 15% as compared with the 12 micron fibre. To obtain a mat of the same weight as when 12 micron fibres are used, it will be apparent that only approximately 29 layers of the 14 micron fibers are required.

The fibre diameter is determined by the speed of the rotating drawing drum which may rotate at 2700 m./min. According to the speed of the rod feed, the fibres thus drawn may be varied in thickness. Thus the fibre diameter is controlled by the rate of feed of moving glass rods while maintaining the drawing speed constant.

The surface air current created by the rotation of the drawing drum for conveying the fibres may be increased so as to convey the fibres any additional distance that may be required, and as hereinbefore described, additional currents of air may be projected into the main stream to ensure that the fibres are conveyed the whole distance from the position of manufacture to the position of deposition on the conveyor belt in the manner hereinbefore described.

I claim:

1. A method of manufacturing a mat of generally uniform density and thickness from staple glass fibres comprising the steps of: forming individual staple fibres from glass filaments; entraining said fibers to float individually in a main current of air; travelling said main current of air along and adjacent the upper periphery of an associated guide means; controlling the rate of flow of said main air current by directing streams of air upwardly at an angle thereto and also intermittently introducing additional streams of air into said main air current; and directing said main air current and additional streams of air to a deposit station at which said individual fibers are deposited in random superposed relationship to build up a mat of uniform density and thickness.

2. A method of manufacturing a mat of generally uniform density and thickness from staple glass fibres comprising the steps of: forming individual staple fibres from glass filaments; entraining said fibres to float individually in a main current of air; travelling said main current of air along and adjacent the upper periphery of an associtaed reciprocating guide means; controlling the rate of flow of said main air current by directing streams of air upwardly at an angle thereto and also introducing additional streams of air into said main air current in synchronism with the reciprocating movement of said guide means; and directing said main air current and additional streams of air to a deposit station at which said individual fibres are deposited in random superposed relationship to build up a mat of uniform density and thickness.

3. A method of manufacturing a mat of generally uniform density and thickness from staple glass fibres comprising the steps of: forming individual staple fibres from glass filaments; entraining said fibres to float individually in a main current of air; travelling said main current of air along and adjacent the upper periphery of an associated reciprocating telescoping guide means; controlling the rate of flow of said main air current by directing streams of air upwardly at an angle thereto and also introducing additional streams of air into said main air current in synchronism with the reciprocating movement of said telescoping guide means; and directing said main air current and additional streams of air to a deposit station at which said individual fibres are deposited in random superposed relationship to build up a mat of uniform density and thickness.

4. The method as claimed in claim 3, including reciprocating said guide means between an open position and a closed position and introducing said additional streams of air into said main air current when said guide means is in the open position.

References Cited by the Examiner

UNITED STATES PATENTS

| | | | |
|---|---|---|---|
| 1,946,784 | 2/1934 | Elliott | 19—156.4 |
| 2,110,280 | 3/1938 | Vieweg | 19—156.4 |
| 2,244,544 | 6/1941 | Smith | 19—156.4 |
| 2,996,102 | 8/1961 | Schuller | 19—156.3 X |
| 3,037,248 | 6/1962 | Callaghan | 19—156.4 |
| 3,051,998 | 9/1962 | Rust et al. | 19—156.4 |

DONALD W. PARKER, *Primary Examiner.*